United States Patent
Masuda et al.

(10) Patent No.: US 10,717,909 B2
(45) Date of Patent: Jul. 21, 2020

(54) CERIUM-BASED ABRASIVE MATERIAL AND PROCESS FOR PRODUCING SAME

(71) Applicant: SHOWA DENKO K.K., Tokyo (JP)

(72) Inventors: Tomoyuki Masuda, Toyama (JP); Hiroshi Saegusa, Toyoma (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 163 days.

(21) Appl. No.: 15/762,857

(22) PCT Filed: Aug. 9, 2016

(86) PCT No.: PCT/JP2016/073486
§ 371 (c)(1),
(2) Date: Mar. 23, 2018

(87) PCT Pub. No.: WO2017/051629
PCT Pub. Date: Mar. 30, 2017

(65) Prior Publication Data
US 2018/0291245 A1 Oct. 11, 2018

(30) Foreign Application Priority Data

Sep. 25, 2015 (JP) ................................. 2015-187767

(51) Int. Cl.
| | | |
|---|---|---|
| C09K 3/14 | (2006.01) |
| C09G 1/02 | (2006.01) |
| C01F 17/00 | (2020.01) |
| B24B 37/00 | (2012.01) |
| C01F 17/206 | (2020.01) |
| B24B 37/04 | (2012.01) |
| C03C 19/00 | (2006.01) |

(52) U.S. Cl.
CPC ............ C09K 3/1418 (2013.01); B24B 37/00 (2013.01); B24B 37/044 (2013.01); C01F 17/00 (2013.01); C01F 17/206 (2020.01); C09G 1/02 (2013.01); C09K 3/1436 (2013.01); C01P 2002/72 (2013.01); C03C 19/00 (2013.01)

(58) Field of Classification Search
CPC .... C09K 3/1418; C09K 3/1436; B24B 37/00; B24B 37/044; C01F 17/0043; C01F 17/00; C09G 1/02; C01P 2002/72; C03C 19/00
See application file for complete search history.

(56) References Cited

U.S. PATENT DOCUMENTS

2007/0258875 A1* 11/2007 Hiraiwa ............... C01F 17/0043
423/21.1
2009/0035202 A1 2/2009 Hiraiwa et al.

FOREIGN PATENT DOCUMENTS

| CN | 85106015 A | 1/1987 |
| CN | 101155891 A | 4/2008 |
| CN | 103509472 A | 1/2014 |
| JP | 2002-224949 A | 8/2002 |
| JP | 2006-097014 A | 4/2006 |
| JP | 2006-124566 A | 5/2006 |
| JP | 2009-501812 A | 1/2009 |
| JP | 2012-066370 A | 4/2012 |
| WO | 2004/092297 A1 | 10/2004 |

OTHER PUBLICATIONS

Extended European Search Report dated May 15, 2019 from European Patent Office in counterpart EP Application No. 16848417.8.
International Search Report for PCT/JP2016/073486 dated Sep. 20, 2016 [PCT/ISA/210].

* cited by examiner

*Primary Examiner* — Pegah Parvini
(74) *Attorney, Agent, or Firm* — Sughrue Mion, PLLC

(57) ABSTRACT

A cerium-based abrasive that achieves a high polishing rate and suppresses the occurrence of surface defects such as scratches and pits and the deposition of the abrasive particles on the polished surface in surface polishing of glass substrates or the like, at low cost with a high production efficiency. The cerium-based abrasive includes a cubic composite rare earth oxide and a composite rare earth oxyfluoride, containing 95.0 to 99.5 mass % of total rare earth elements in terms of oxides, containing 54.5 to 95.0 mass % of cerium in terms of oxide, 4.5 to 45.0 mass % of lanthanum in terms of oxide, and 0.5 to 2.0 mass % of neodymium in terms of oxide relative to the total rare earth elements in terms of oxides, containing 0.5 to 4.0 mass % of fluorine atoms, and containing 0.001 to 0.50 mass % of sodium atoms relative to the total rare earth elements in terms of oxides.

6 Claims, 1 Drawing Sheet

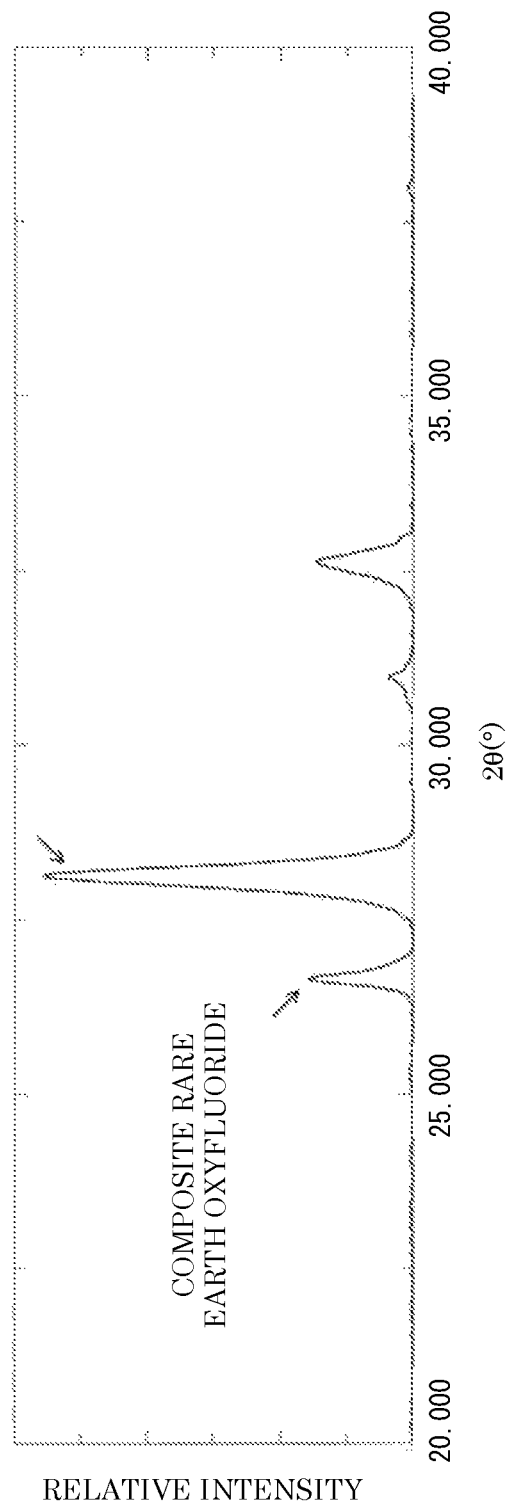

CERIUM-BASED ABRASIVE MATERIAL AND PROCESS FOR PRODUCING SAME

CROSS REFERENCE TO RELATED APPLICATIONS

This application is a National Stage of International Application No. PCT/JP2016/073486, filed on Aug. 9, 2016, which claims priority from Japanese Patent Application No. 2015-187767, filed on Sep. 25, 2015.

TECHNICAL FIELD

The present invention relates to a cerium-based abrasive for use in polishing glass materials such as glass substrates for use in liquid crystal panels, hard disks, and filters for cutting specific frequencies, and glass substrates for use in optical lenses; and a manufacturing method thereof.

BACKGROUND ART

Glass materials have been used in various applications, and surface polishing is required depending on the application thereof in some cases. For example, mirror finish is required for optical lenses. Also, for use in glass substrates for optical disks and magnetic disks, glass substrates for thin film transistor (TFT) type or super-twisted nematic (STN) type liquid crystal displays (LCD), color filters for a liquid crystal television, and glass substrates for photomasks for a large scale integrated circuit (LSI), more precise surface polishing is required to achieve high flatness with a small surface roughness, and, in addition, to have no defects.

Cerium-based abrasives have been conventionally used in surface polishing of such glass materials. The cerium-based abrasives typically contain about several % fluorine atoms so as to increase the polishing power.

Although the detailed polishing mechanism of cerium-based abrasives is not clear, it has been confirmed that polishing is accelerated by the combined functions of a mechanical effect due to the hardness of the cerium oxide particles themselves, and a chemical effect due to the contained fluorine. It is also known that in cases where fluorine is contained in advance in raw materials to be fired when manufacturing abrasives, sintering of the constituent particles of the abrasive when firing is appropriately accelerated to obtain abrasives exhibiting high polishing power.

The surface precision required for glass substrates, however, has become more severe in recent years, and cerium-based abrasives are also required not to cause surface defects such as scratches, pits, and the deposition of abrasive particles, even at a high polishing rate.

Corresponding to the requirements, for example, PTL1 proposes the improvement in the polishing power and the polishing precision by reducing the content of fluorine atoms in view of environmental concerns, and controlling the alkali metal content at 0.01 to 3.0 mass % and the chlorine concentration at 0.3 mass % or less relative to the total rare earth elements in terms of oxides (TREO).

Further, PTL2 describes a 2-component cerium-based abrasive which contains fluorine atoms and rare earth elements substantially composed of cerium and lanthanum through control of the content of oxides of rare earth elements other than cerium such as neodymium and praseodymium.

CITATION LIST

Patent Literature

PTL1: JP 2006-124566A
PTL2: JP 2012-66370A

SUMMARY OF INVENTION

Technical Problem

Although the cerium-based abrasive described in the PTL1 can reduce the occurrence of scratches on the polished surface due to containing almost no fluorine, lanthanum oxyfluoride (LaOF) is insufficiently formed by the reaction between lanthanum oxide and fluorine in the abrasive. Consequently, the deposition of abrasive particles on the polished surface easily occurs, and it is difficult to ensure a polishing rate equivalent to those when abrasives containing more fluorine are used. Furthermore, in the firing step of the raw material of abrasives with a small content of fluorine, the raw material particles are hardly sintered at low temperature, so that a higher sintering temperature is required to ensure a high polishing rate, resulting in a higher energy cost in manufacturing.

On the other hand, the cerium-based abrasive described in PTL2 has a large content of fluorine atoms of 5.0 to 15.0 mass %. Although the deposition of abrasive particles on the polished surface hardly occurs, sintering of the raw material particles is remarkably accelerated in the firing step of the raw material of the abrasive, so that the abnormal grain growth tends to cause surface defects such as scratches and pits on the polished surface.

Conventional cerium-based abrasives raise a problem that, although a high polishing rate can be ensured with a high content of fluorine atoms, scratches tend to occur on the polished surface; whereas a high polishing rate cannot be ensured with a lower content of fluorine atoms due to easy deposition of the abrasive particles on the polished surface.

The present invention has been made to solve the technical problem described above. The object of the present invention is to provide a cerium-based abrasive that achieves a high polishing rate and suppresses the occurrence of surface defects such as scratches and pits and the deposition of the abrasive particles on the polished surface at low cost with a high production efficiency, and a manufacturing method thereof in surface polishing of a glass substrate or the like.

Solution to Problem

Focusing on the effects of the content ratio of cerium, lanthanum and neodymium as rare earth elements and the content of fluorine atoms and sodium atoms in a cerium-based abrasive on the polishing characteristics, the present invention is based on a finding that the content in specific ranges improves not only the polishing rate and the surface precision but also the production efficiency of the cerium-based abrasive.

Specifically, the present invention provides the following [1] to [6];

[1] A cerium-based abrasive comprising a cubic composite rare earth oxide and a composite rare earth oxyfluoride, containing 95.0 to 99.5 mass % of total rare earth elements in terms of oxides, containing 54.5 to 95.0 mass % of cerium in terms of oxide, 4.5 to 45.0 mass % of lanthanum in terms of oxide, and 0.5 to 2.0 mass % of neodymium in terms of oxide relative to the total rare earth elements in terms of oxides, containing 0.5 to 4.0 mass % of fluorine atoms, and containing 0.001 to 0.50 mass % of sodium atoms relative to the total rare earth elements in terms of oxides.

[2] The cerium-based abrasive according to the item [1], wherein the intensity ratio of the main peak of the rare earth oxyfluoride to the main peak of the cubic composite rare earth oxide in the X-ray diffraction measurement using Cu Kα radiation is 0.01 to 0.50.

[3] A method for manufacturing the cerium-based abrasive according to the item [1] or [2], comprising the steps of: firing mixed light rare earth compounds containing cerium, lanthanum and neodymium at 500 to 1100° C. to obtain a mixed rare earth oxides, adding rare earth fluorides containing cerium, lanthanum and neodymium to the mixed rare earth oxides, and pulverizing and firing a resultant mixture, wherein a sodium compound is added prior to the firing.

[4] The method according to the item [3], wherein the rare earth fluorides are obtained by adding fluorides to the mixed light rare earth compounds and heat-treating the mixture at 400° C. or lower.

[5] The method according to the item [3] or [4], wherein the mixing mass ratio of the mixed rare earth oxides to the rare earth fluorides to be added is 99:1 to 65:35.

[6] The method according to any one of the items [3] to [5], wherein the sodium compound is at least one sodium salt selected from the group consisting of sodium hydrogen carbonate, sodium carbonate, sodium acetate, sodium phosphate, sodium sulfate, sodium nitrate, sodium oxalate and sodium polyacrylate.

Advantageous Effects of Invention

According to the cerium-based abrasive of the present invention, a high-quality polished surface can be obtained in surface polishing of a glass substrate or the like, at a high polishing rate, with the occurrence of surface defects such as scratches and pits and the deposition of the abrasive particles on the polished surface being suppressed.

Furthermore, according the manufacturing method of the present invention, the cerium-based abrasive can be manufactured at low cost with a high production efficiency.

BRIEF DESCRIPTION OF DRAWING

FIG. 1 is a chart illustrating an X-ray diffraction spectrum of the cerium-based abrasive in Example 2.

DESCRIPTION OF EMBODIMENT

The present invention is described in detail as follows.
[Cerium-Based Abrasive]

The cerium-based abrasive of the present invention comprises a cubic composite rare earth oxide and a composite rare earth oxyfluoride. The total content of the rare earth elements in terms of oxides (TREO) is 95.0 to 99.5 mass %, and relative to the TREO, 54.5 to 95.0 mass % of cerium in terms of oxide, 4.5 to 45.0 mass % of lanthanum in terms of oxide, and 0.5 to 2.0 mass % of neodymium in terms of oxide are contained. Further, 0.5 to 4.0 mass % of fluorine atoms, and relative to the TREO, 0.001 to 0.50 mass % of sodium atoms are contained.

The TREO is measured by gravimetry via oxalate precipitation and firing, more specifically by the method described below in Examples.

The content of rare earth elements can be measured by instrumental analysis such as inductively coupled plasma (ICP) and fluorescent X-ray analysis. In the present invention, the measurement values by ICP analysis are converted to the amount of rare earth elements in terms of oxides.

Due to containing cerium, lanthanum and neodymium in a specific ratio as described above and further containing a specific amount of sodium atoms, the cerium-based abrasive of the present invention can achieve a high polishing rate and suppresses the occurrence of surface defects such as scratches and pits and the deposition of the abrasive particles on the polished surface of glass or the like even with a relatively small content of fluorine atoms, so that a high-quality polished surface can be obtained.

The cerium-based abrasive of the present invention essentially comprises a cubic composite rare earth oxide and a composite rare earth oxyfluoride.

The cubic composite rare earth oxide is made of oxides represented by, for example, $RE_2O_3$, with RE standing for rare earth elements. The composite rare earth fluoride is made of fluorine-containing compounds represented by, for example, REOF·REO.

The cerium-based abrasive of the present invention is essentially composed of these compounds. The term "essentially" means that the crystal structure of the abrasive is fundamentally composed of a cubic composite rare earth oxide and a composite rare earth oxyfluoride, and almost no peaks of crystals other than those of the compounds are detected in the X-ray diffraction measurement. Incidentally, peaks of crystals resulting from the addition of additives or the like other than the compounds of rare earth elements in the abrasive are excluded from the peaks of crystals.

The TREO content in the cerium-based abrasive is 95.0 to 99.5 mass %, preferably 95.2 to 99.3 mass %, more preferably 95.5 to 99.0 mass %.

With a TREO content of less than 95.0 mass %, the number of particles not contributing to polishing increases, so that the polishing rate is lowered or scratches occur on the polished surface. With a TREO content of more than 99.5 mass %, the relative content of fluorine atoms and sodium atoms decreases, so that the effect of the components on maintaining a high polishing rate and suppressing the surface defects on the polished surface cannot be obtained.

The cerium content in terms of oxide is 54.5 to 95.0 mass %, preferably 58.0 to 95.0 mass %, more preferably 60.0 to 92.0 mass %, relative to the TREO.

With the content being less than 54.5 mass %, the number of particles not contributing to polishing increases, so that the polishing rate is lowered or scratches occur on the polished surface. With the content being more than 95.0 mass %, the relative content of other rare earth elements decreases, so that the effect on suppressing the surface defects on the polished surface is insufficiently obtained.

The lanthanum content in terms of oxide is 4.5 to 45.0 mass %, preferably 6.0 to 40.0 mass %, more preferably 9.0 to 35.0 mass %, relative to the TREO. The neodymium content in terms of oxide is 0.5 to 2.0 mass %, preferably 0.5 to 1.5 mass %, more preferably 0.5 to 1.0 mass %, relative to the TREO.

With each of the content of lanthanum and neodymium of less than the range, scratches tend to occur on the polished surface, and with each of more than the range, the polishing rate tends to be lowered.

The fluorine atom content in the cerium-based abrasive is in the range of 0.5 to 4.0 mass %, preferably 0.7 to 4.0 mass %, more preferably 0.9 to 4.0 mass %.

With the content being less than 0.5 mass %, the polishing rate is lowered, and with the content being more than 4.0 mass %, the sintering of the abrasive particles is accelerated, so that scratches tend to occur on the polished surface.

Furthermore, the sodium atom content is 0.001 to 0.50 mass %, preferably 0.002 to 0.40 mass %, more preferably 0.005 to 0.30 mass %, relative to the TREO.

With the content being less than 0.001 mass %, the polishing rate is lowered or the deposition of the abrasive particles on the polished surface tends to occur. With the content being more than 0.50 mass %, the sintering of the abrasive particles is accelerated, so that scratches tend to occur on the polished surface.

The cerium-based abrasive has a main peak (2θ) resulting from the cubic composite rare earth oxide positioned preferably at 28° or more in the X-ray diffraction measurement. With the main peak positioned in such a range, the polishing rate can be increased and scratches tend not to occur on the polished surface.

The X-ray diffraction measurement is performed by an X-ray diffractometer (manufactured by Rigaku Corporation) using an X-ray tube (Cu anode) and an Ni foil filter, under conditions of Cu Kα radiation, at an X-ray generation voltage of 40 kV, a current of 30 mA, a scanning speed of 4.0°/min, a measurement step of 0.02°/min, a divergence slit and a scattering slit of 1°, and a light-receiving slit of 0.3 mm.

In the X-ray diffraction measurement, the intensity ratio of the main peak of the rare earth oxyfluorides to the main peaks of the cubic composite rare earth oxides is preferably 0.01 to 0.50, more preferably 0.05 to 0.40, still more preferably in the range of 0.06 to 0.34.

The intensity of the peak means the maximum value of the diffraction intensity. The position of the main peak (2θ) of the rare earth oxyfluorides in the cerium-based abrasive is about 26.7°.

With an intensity ratio between the main peaks in the range, the reduction in the polishing speed or the occurrence of surface defects on the polished surface caused by lanthanum oxide in the cerium-based abrasive can be sufficiently suppressed.

The specific surface area of the cerium-based abrasive is preferably 2.0 to 8.0 m$^2$/g, more preferably 2.5 to 8.0 m$^2$/g, still more preferably 2.7 to 8.0 m$^2$/g. The specific surface area is measured by the BET method.

With a specific surface area of 2.0 m/g$^2$ or more, the occurrence of scratches on the polished surface is suppressed, and with a specific surface area of 8.0 m$^2$/g or less, a sufficiently high polishing rate can be maintained.

The average particle diameter D50 of the cerium-based abrasive is preferably 0.5 to 3.0 μm, more preferably 0.7 to 2.0 μm, still more preferably 0.8 to 1.7 μm, though depending on the object to be polished, the polishing conditions, etc.

The average particle diameter D50 in the present invention corresponds to the particle diameter at 50% in the cumulative volume distribution measured by a particle size distribution analyzer (Coulter Multisizer manufactured by Beckman Coulter, Inc.) with a 30-μm aperture tube.

The cerium-based abrasive of the present invention is usually handled in a powder form and dispersed, for example, in a dispersion medium such as water for use in a slurry state during polishing. The dispersion concentration of the abrasive in the slurry is suitably adjusted typically at 1.0 to 30.0 mass %, depending on the object to be polished, the polishing conditions, etc.

As the dispersion medium of the slurry, water or a water-soluble organic solvent is suitably used, and water is typically used. Examples of the water-soluble organic solvent include alcohols, polyalcohols, acetone and tetrahydrofuran.

In order to achieve improvement in the dispersibility, prevention of the precipitation, improvement in the stability and improvement in the workability on an as needed basis, glycols such as ethylene glycol and polyethylene glycol; phosphates such as tripolyphosphoric acid and hexametaphosphate; polymeric dispersants such as a polyacrylate; cellulose ethers such as methyl cellulose and carboxymethyl cellulose; and water-soluble polymers such as polyvinyl alcohol may be added to the slurry. Each amount added relative to the solid mass in the slurry of the cerium-based abrasive is usually 0.05 to 20 mass %, preferably 0.1 to 15 mass %, more preferably 0.1 to 10 mass %.

The cerium-based abrasive of the present invention is particularly suitably used in the final polishing of various glass materials and glass products such as a glass substrate for optical disks or magnetic disks, a glass substrate for liquid crystal displays, a glass substrate for a color filter or photomasks, and a glass substrate for optical lenses.

A glass substrate or the like polished by using the cerium-based abrasive of the present invention can have a high-quality polished surface, with the occurrence of surface defects such as scratches and pits and the deposition of abrasive particles on the polished surface being suppressed.

[Method for Manufacturing Cerium-Based Abrasive]

A method for manufacturing a cerium-based abrasive of the present invention is a method for manufacturing the cerium-based abrasive described above, comprising the steps of firing mixed light rare earth compounds containing cerium, lanthanum and neodymium at 500 to 1100° C. to obtain a mixed rare earth oxides, adding rare earth fluorides containing cerium, lanthanum and neodymium to the mixed rare earth oxides, and pulverizing and firing a resultant mixture, wherein a sodium compound is added prior to the firing.

The addition and mixing of the sodium compound may be performed any time prior to the firing, i.e., at the time of addition of the rare earth fluorides to the mixed rare earth oxides, after pulverization of raw materials to be fired other than the sodium compound, at the time of pulverization, or immediately before the firing. The addition of the sodium compound prior to the firing enables the cerium-based abrasive of the present invention to be efficiently manufactured.

More specifically, it is preferable that the manufacturing be performed through the steps of; (1) firing mixed light rare earth compounds containing cerium, lanthanum and neodymium at 500 to 1100° C. to obtain mixed rare earth oxides; (2) adding rare earth fluorides containing cerium, lanthanum and neodymium to the mixed rare earth oxides, wet pulverizing the resultant mixture, and adding a sodium compound thereto so as to be mixed to prepare the raw material to be fired; and (3) drying the raw material to be fired and then firing, cracking and classifying the material.

Each of the steps is described as follows.

(Step (1))

First, mixed light rare earth compounds containing cerium, lanthanum and neodymium are fired at 500 to 1100° C. to make mixed rare earth oxides.

The term "mixed light rare earth compounds" means mixed rare earth carbonates, mixed rare earth oxalates or mixed rare earth hydroxides mainly composed of cerium, with a reduced content of non-rare earth components such as alkaline metals, alkaline earth metals and radioactive substances (impurities) and medium and heavy rare earths.

Although the method for obtaining the mixed light rare earth compounds is not particularly limited, the compounds are preferably obtained by chemically separating and removing the impurities other than rare earth elements and medium and heavy rare earths from ores containing rare earth elements.

As the ores containing rare earth elements, rare earth concentrates such as bastnasite and monazite rich in cerium, lanthanum, neodymium and praseodymium as natural light rare earth elements are preferably used. From such raw material ores, impurities and medium and heavy rare earths are chemically separated and removed so as to obtain mixed light rare earth compounds such as mixed rare earth carbonates, mixed rare earth oxalates or mixed rare earth hydroxides mainly composed of cerium, with a reduced content of the impurities and medium and heavy rare earths.

The term "medium and heavy rare earths" is intended to refer to rare earths having a larger atomic number than promethium (Pm). The term "mainly composed of cerium" means that the content of cerium is the largest among rare earth elements, i.e., 40 mass % or more relative to TREO in terms of oxides, more preferably 50 mass % or more, still more preferably 60 mass % or more.

Sulfuric acid roasting is a typical method for chemically separating and removing impurities. Sulfuric acid roasting is a method of roasting pulverized raw ores together with sulfuric acid to form a sulfate, and dissolving the sulfate in water to remove insoluble impurities.

Solvent extraction is a typical method for chemically separating and removing medium and heavy rare earths. More specifically, after impurities are separated and removed from raw material ores as described above, the material is made into mixed rare earth hydroxides with an alkali such as sodium hydroxide. The rare earth hydroxides are then dissolved in hydrochloric acid to make an aqueous solution of mixed rare earth chlorides. Medium and heavy rare earths are then removed therefrom by solvent extraction using an organic solvent. In the solvent extraction, the content of cerium, lanthanum and neodymium can be adjusted by a known method such as control of the extraction degree and use of additives on an as needed basis.

Although the mixed light rare earth compounds are obtained by separating and removing impurities and medium and heavy rare earths in such a manner, the mixed light rare earth compounds to make the raw material of the mixed rare earth oxides may contain mixed rare earth carbonates or mixed rare earth oxalates, i.e., the carbonates or oxalates made from sodium carbonate, ammonium bicarbonate, oxalic acid or the like after the separation and removal treatment. In the separation and removal of impurities and medium and heavy rare earths, the content of impurities in the mixed light rare earth compounds needs only to be 1 mass % or less, and the content of the medium and heavy rare earths to be 1 mass % or less in terms of oxides.

For example, in cases where the mixed light rare earth compounds are mixed rare earth carbonates, it is preferable that the mixed light rare earth compounds comprise 45 to 55 mass % of TREO, with a cerium content of 54.5 to 95.0 mass % in terms of oxide, a lanthanum content of 4.5 to 45.0 mass % in terms of oxide, a neodymium content of 0.5 to 2.0 mass % in terms of oxide, a content of non-rare earth components other than carboxylic acid of 0.5 mass % or less, each relative to the TREO, and the balance of carboxylic acid.

The mixed light rare earth compounds are fired at 500 to 1100° C. to make mixed rare earth oxides.

The mixed rare earth oxides can be obtained by firing the mixed light rare earth compounds at a temperature in the range to make oxides in such a manner.

The firing temperature is appropriately adjusted depending on the composition of the mixed rare earth compounds, preferably at 600 to 1000° C., more preferably at 700 to 900° C. The firing time is preferably 0.5 to 24 hours, more preferably 1 to 12 hours, still more preferably 1.5 to 5 hours (Step (2))

Rare earth fluorides containing cerium, lanthanum and neodymium are added to the mixed rare earth oxides obtained in the step (1), followed by wet pulverizing. A sodium compound is added to the pulverized mixture to be mixed to prepare the raw material to be fired.

It is preferable that the mixture to be pulverized contain mixed rare earth oxides as main raw material and rare earth fluorides as auxiliary raw material in a predetermined ratio. The mixing ratio between the mixed rare earth oxides and the rare earth fluorides is appropriately determined corresponding to the content of fluorine atoms required for the cerium-based abrasive to be manufactured. In other words, the fluorine atom content in the cerium-based abrasive can be easily adjusted by changing the mixing ratio of the rare earth fluorides. Since the rare earth fluorides remaining unreacted in the cerium-based abrasive to be manufactured result in hard particles that may cause scratches on the polished surface, the mixing ratio of the rare earth fluorides is preferably smaller than that of the mixed rare earth oxides. From such a viewpoint, the mixing mass ratio between the mixed rare earth oxides and the rare earth fluorides is preferably 99:1 to 65:35, more preferably 97:3 to 77:23, still more preferably 95:5 to 81:19.

The rare earth fluorides are preferably mainly composed of cerium, having a TREO content of preferably 60 to 90 mass %, more preferably 65 to 88 mass %, still more preferably 75 to 85 mass %. The fluorine atom content is preferably 20 to 30 mass %, more preferably 22 to 29 mass %, still more preferably 25 to 28 mass %.

Such rare earth fluorides can be obtained by adding fluorides such as hydrofluoric acid, ammonium fluoride, or acidic ammonium fluoride as fluorine source to the mixed light rare earth compounds and heat-treating the mixture at 400° C. or lower.

The rare earth fluorides heat-treated at a temperature in the range allow the reactivity between the fluorines in the rare earth fluorides and the mixed rare earth oxides to be mixed with the rare earth fluorides to increase, so that hard particles of the rare earth fluorides hardly remain, which is desirable.

Other than the mixed rare earth oxides and the rare earth fluorides, mixed rare earth carbonates containing cerium, lanthanum and neodymium may be added to the mixture.

The wet pulverization is preferably performed with a media mill such as a wet ball mill in view of uniformly mixing and pulverizing the mixed rare earth oxides and the rare earth fluorides. Water is preferably used as the dispersion medium. A mixed slurry is thereby obtained.

After the wet pulverization, the mixture has an average particle diameter D50 of preferably 0.5 to 3.0 µm, more preferably 0.7 to 2.8 µm, still more preferably 0.9 to 2.5 µm, in view of handling in later steps.

A sodium compound is added to the mixed slurry obtained by the wet pulverization so as to be mixed to prepare the raw material to be fired. In other words, the raw material to be fired contains mixed rare earth oxides, rare earth fluorides and a sodium compound. As described above, mixed rare earth carbonates may be contained.

Specific examples of the sodium compounds added include sodium hydrogen carbonate, sodium carbonate, sodium acetate, various sodium phosphates, sodium sulfate, sodium nitrate, a sodium salt of organic acid such as sodium oxalate, and a sodium salt of organic polymer such as polyacrylate. Among these, sodium hydrogen carbonate is preferred. These sodium salts may be used singly or in combination of two or more.

The amount of the sodium compound added is appropriately adjusted, such that the content of sodium atoms in the cerium-based abrasive to be obtained satisfies the range described above.

(Step (3))

The raw material to be fired obtained in the step (2) is dried, and then fired, cracked and classified to obtain a cerium-based abrasive.

Drying, firing, cracking and classification may be performed in the same manner as the method applied to the manufacturing of conventional cerium-based abrasives.

In view of sufficient reaction of the raw material to be fired by the firing, the firing temperature is preferably 600 to 1200° C., more preferably 650 to 1150° C., still more preferably 700 to 1100° C. The firing time is preferably 0.5 to 48 hours, more preferably 1 to 36 hours, still more preferably 1.5 to 24 hours. The firing atmosphere is preferably an air atmosphere.

EXAMPLES

The present invention is described with reference to Examples as follows, though the present invention is not limited thereto.

Example 1

A raw material ore (rare earth concentrate) containing 47 mass % of TREO, 2 mass % of medium and heavy rare earths in terms of oxides, and 8 mass % of neodymium in terms of oxide was treated by sulfuric acid roasting and solvent extraction to reduce the content of impurities made of non-rare earth components to 1 mass % or less and the content of medium and heavy rare earths in terms of oxides to 1 mass % or less, so that mixed light rare earth compounds were prepared through the adjustment of the content of rare earth elements. The mixed light rare earth compounds contained 64.6 mass % of cerium in terms of oxide ($CeO_2$), 34.6 mass % of lanthanum in terms of oxide ($La_2O_3$), and 0.7 mass % of neodymium in terms of oxide ($Nd_2O_3$), relative to TREO.

The mixed light rare earth compounds were treated with ammonium bicarbonate to obtain mixed rare earth carbonates. The mixed rare earth carbonates contained 49 mass % of TREO.

The mixed rare earth carbonates in amount of 2 kg was heat-treated at 800° C. for 2 hours in an electric furnace to make mixed rare earth oxides. The mixed rare earth oxides contained 93 mass % of TREO.

Hydrofluoric acid was added to a part of the mixed light rare earth compounds, and the mixture was heat-treated at 400° C. for 2 hours, so that rare earth fluorides were obtained. The rare earth fluorides contained 85 mass % of TREO, and 64.6 mass % of cerium in terms of oxide, 34.6 mass % of lanthanum in terms of oxide, and 0.7 mass % of neodymium in terms of oxide, relative to TREO, with 27 mass % of fluorine atoms.

To the mixture of 100 g of the rare earth fluorides and 900 g of the mixed rare earth oxides, 600 g of water was added, and the mixture was pulverized with a wet ball mill (milling media: zirconia balls with a diameter of 5 mm), so that a slurry containing particles with an average diameter D50 of 1.7 μm was obtained.

To the slurry, 5 g of sodium hydrogen carbonate as a sodium compound was added and mixed to prepare the raw material to be fired.

In Table 1, the content of TREO, rare earth elements, and fluorine atoms in the mixed rare earth oxides and the rare earth fluorides used in the raw material to be fired are shown.

The raw material to be fired was dried in a hot air dryer at 100° C., and then fired at 1100° C. for 2 hours in an electric furnace. The fired product was cooled, and then pulverized and classified to make a cerium-based abrasive.

Examples 2 to 16 and Comparative Examples 1 to 6

The cerium-based abrasives were made in the same manner as in Example 1, except that the mixed rare earth oxides and the rare earth fluorides, with TREO, a rare earth element content and a fluorine atom content shown in Table 1, were used, and the conditions of the type and amount of the sodium compound added (blended) and the firing temperature of the prepared raw material to be fired shown in Table 2 were employed.

The average particle diameter D50 of the pulverized powder in the slurry, however, was 1.0 μm in Example 13, and 2.0 μm in Example 14.

TABLE 1

| | | | | Content (mass %) | | | | |
|---|---|---|---|---|---|---|---|---|
| | | | TREO | $[CeO_2]$/TREO | $[La_2O_3]$/TREO | $[Nd_2O_3]$/TREO | $[Pr_6O_{11}]$/TREO | F |
| Example | 1 | Mixed rare earth oxides | 93 | 64.6 | 34.6 | 0.7 | 0.1 | — |
| | | Rare earth fluorides | 85 | 64.6 | 34.6 | 0.7 | 0.1 | 27 |
| | 2 | Mixed rare earth oxides | 93 | 64.6 | 34.6 | 0.7 | 0.1 | — |
| | | Rare earth fluorides | 85 | 64.6 | 34.6 | 0.7 | 0.1 | 27 |
| | 3 | Mixed rare earth oxides | 93 | 64.6 | 34.6 | 0.7 | 0.1 | — |
| | | Rare earth fluorides | 85 | 64.6 | 34.6 | 0.7 | 0.1 | 27 |
| | 4 | Mixed rare earth oxides | 93 | 64.6 | 34.6 | 0.7 | 0.1 | — |
| | | Rare earth fluorides | 85 | 64.6 | 34.6 | 0.7 | 0.1 | 27 |
| | 5 | Mixed rare earth oxides | 93 | 64.7 | 34.7 | 0.5 | 0.1 | — |
| | | Rare earth fluorides | 85 | 64.7 | 34.7 | 0.5 | 0.1 | 27 |
| | 6 | Mixed rare earth oxides | 93 | 64.5 | 34.5 | 1.0 | 0.1 | — |
| | | Rare earth fluorides | 85 | 64.5 | 34.5 | 1.0 | 0.1 | 27 |

TABLE 1-continued

|  |  |  | Content (mass %) | | | | |
|---|---|---|---|---|---|---|---|
|  |  |  | TREO | [CeO$_2$]/ TREO | [La$_2$O$_3$]/ TREO | [Nd$_2$O$_3$]/ TREO | [Pr$_6$O$_{11}$]/ TREO | F |
|  | 7 | Mixed rare earth oxides | 93 | 70.0 | 29.2 | 0.7 | 0.1 | — |
|  |  | Rare earth fluorides | 85 | 70.0 | 29.2 | 0.7 | 0.1 | 27 |
|  | 8 | Mixed rare earth oxides | 93 | 80.0 | 19.2 | 0.7 | 0.1 | — |
|  |  | Rare earth fluorides | 85 | 80.0 | 19.2 | 0.7 | 0.1 | 27 |
|  | 9 | Mixed rare earth oxides | 93 | 90.0 | 9.2 | 0.7 | 0.1 | — |
|  |  | Rare earth fluorides | 85 | 90.0 | 9.2 | 0.7 | 0.1 | 27 |
|  | 10 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 11 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 12 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 13 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 14 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 15 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 16 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
| Comparative Example | 1 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 2 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 3 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 4 | Mixed rare earth oxides | 93 | 64.9 | 34.9 | 0.1 | 0.1 | — |
|  |  | Rare earth fluorides | 85 | 64.9 | 34.9 | 0.1 | 0.1 | 27 |
|  | 5 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |
|  | 6 | Mixed rare earth oxides | 93 | 64.6 | 34.6 | 0.7 | 0.1 | — |
|  |  | Rare earth fluorides | 85 | 64.6 | 34.6 | 0.7 | 0.1 | 27 |

[Component Contained in Abrasive]

The TREO, the amount of each of the rare earth elements in terms of oxide relative to TREO, the fluorine atom content, and the sodium atom content relative to TREO of each of the cerium-based abrasives obtained in Examples and Comparative Examples are shown together in the following Table 2. The measurement methods thereof are as follows.

In the measurement of the TREO, the abrasive was dissolved in acid, and ammonia water was added to the solution to cause precipitates. The precipitates were filtered, washed to remove alkaline metals, and then dissolved in acid again. Oxalic acid was added to the solution to cause precipitates. The precipitates were fired and subjected to the measurement by a gravimetric method.

In the measurement of the amount of each of the rare earth elements in terms of oxides relative to TREO, the abrasive was dissolved in acid and subjected to the ICP emission spectroscopy (ICP-AES).

In the measurement of the fluorine atom content, the abrasive was subjected to alkali fusion and hot water extraction for the fluoride ion selective electrode method.

In the measurement of the sodium atom content, the abrasive was dissolved in acid and subjected to the atomic absorption analysis.

[Measurement of Physical Properties of Abrasive]

The average particle diameter D50, the intensity ratio of the main peak of the rare earth oxyfluoride to the main peaks of the cubic composite rare earth oxide (peak intensity ratio) in the X-ray diffraction measurement (Cu Kα radiation), and the specific surface area of each of the cerium-based abrasives obtained in the Examples and Comparative Examples are shown together in the following Table 2. The measurement methods thereof are as follows.

The average particle size D50 was measured by a particle size distribution analyzer (Coulter Multisizer manufactured by Beckman Coulter, Inc.) with a 30-μm aperture tube, the size corresponding to the particle diameter at 50% in the cumulative volume distribution.

The peak intensity ratio in the X-ray diffraction measurement was obtained as follows. The X-ray diffraction measurement was performed by an X-ray diffractometer (manufactured by Rigaku Corporation) using an X-ray tube (Cu anode) and an Ni foil filter, under conditions of Cu Kα radiation, at an X-ray generation voltage of 40 kV, a current of 30 mA, a scanning speed of 4.0°/min, a measurement step of 0.02°/min, a divergence slit and a scattering slit of 1°, and a light-receiving slit of 0.3 mm, so that the ratio between the maximum intensity value of the main peak of the cubic composite rare earth oxides positioned at 28.2° or more and the maximum intensity value of the main peak (2θ) of the rare earth oxyfluorides positioned at about 26.7° was obtained. In FIG. 1, an X-ray diffraction spectrum of the cerium-based abrasive in Example 2 is shown as a representative example.

The specific surface area was measured according to "6.2 Flow method, (3.5) Single point method" in JIS R 1626-1996 (Measuring methods for the specific surface area of fine ceramic powders by gas adsorption using the BET method). As the adsorptive gas, nitrogen was used.

[Polishing Test]

From each of the cerium-based abrasives obtained in the Examples and Comparative Examples, a slurry of the abrasive dispersed in water at a concentration of 10 mass % was prepared. Using the abrasive slurry, a polishing test of alkali-free glass substrates for TFT liquid crystal displays was performed under the following conditions:

Polishing machine: a single side polishing machine
Workpiece: a 5-cm square alkali-free glass plate having an area of 25 cm$^2$
Number of sheets processed: one/batch×3 batches
Polishing pad: a polyurethane foam pad
Revolution of lower surface plate: 260 rpm
Processing pressure: 80 g/cm$^2$
Polishing time: 20 minutes The polishing rate and the evaluation results on the presence of scratches and deposits on the polished surface in the polishing test are shown together in Table 2. The evaluation methods are as follows.

The polishing rate was obtained from the average of the thickness at 4 points per sheet of the glass substrate before polishing measured with a micrometer and the weight change before and after the polishing.

For the evaluation of scratches, the glass surface was observed using a differential interference microscope with a magnification of 50 times to measure the number of scratches per polished surface.

For the confirmation of the presence of deposits, the observation was performed under a halogen light source at 100,000 lux. In Table 2, the evaluation results are shown based on the number of deposited particles per polished surface as follows. Excellent: zero, Good: 1, Fair: 2 to 9, and Poor: 10 or more.

TABLE 2

| | | Blending amount (g) | | | | Content (mass %) | | | |
|---|---|---|---|---|---|---|---|---|---|
| | | Mixed rare earth oxides | Rare earth fluoride | Sodium compound | | Firing temperature (° C.) | TREO | [CeO$_2$]/ TREO | [La$_2$O$_3$]/ TREO | [Nd$_2$O$_3$]/ TREO |
| Example | 1 | 900 | 100 | Sodium hydrogen carbonate | 5 | 1100 | 97.5 | 64.6 | 34.6 | 0.7 |
| | 2 | 835 | 165 | Sodium hydrogen carbonate | 5 | 1040 | 95.9 | 64.6 | 34.6 | 0.7 |
| | 3 | 835 | 165 | Sodium hydrogen carbonate | 2 | 1090 | 96.0 | 64.6 | 34.6 | 0.7 |
| | 4 | 835 | 165 | Sodium hydrogen carbonate | 10 | 990 | 95.8 | 64.6 | 34.6 | 0.7 |
| | 5 | 835 | 165 | Sodium hydrogen carbonate | 5 | 1040 | 95.9 | 64.7 | 34.7 | 0.5 |
| | 6 | 835 | 165 | Sodium hydrogen carbonate | 5 | 1040 | 95.9 | 64.5 | 34.5 | 1.0 |
| | 7 | 835 | 165 | Sodium hydrogen carbonate | 5 | 1000 | 95.9 | 70.0 | 29.2 | 0.7 |
| | 8 | 880 | 120 | Sodium hydrogen carbonate | 5 | 970 | 95.9 | 80.0 | 19.2 | 0.7 |
| | 9 | 900 | 100 | Sodium hydrogen carbonate | 5 | 940 | 95.9 | 90.0 | 9.2 | 0.7 |
| | 10 | 950 | 50 | Sodium hydrogen carbonate | 0.2 | 1020 | 98.8 | 90.0 | 9.2 | 0.7 |
| | 11 | 950 | 50 | Sodium hydrogen carbonate | 5 | 1000 | 98.6 | 90.0 | 9.2 | 0.7 |
| | 12 | 835 | 165 | Sodium hydrogen carbonate | 5 | 1040 | 95.9 | 64.6 | 34.6 | 0.7 |
| | 13 | 835 | 165 | Sodium hydrogen carbonate | 5 | 1040 | 95.9 | 64.6 | 34.6 | 0.7 |
| | 14 | 835 | 165 | Sodium hydrogen carbonate | 5 | 1090 | 95.9 | 64.6 | 34.6 | 0.7 |
| | 15 | 835 | 165 | Sodium carbonate | 3.2 | 1040 | 95.9 | 64.6 | 34.6 | 0.7 |
| | 16 | 835 | 165 | Sodium carbonate | 5 | 1040 | 95.9 | 64.6 | 34.6 | 0.7 |
| Comparative Example | 1 | 800 | 200 | Sodium hydrogen carbonate | 5 | 960 | 95.1 | 64.6 | 34.6 | 0.7 |
| | 2 | 762 | 238 | Sodium hydrogen carbonate | 5 | 880 | 94.3 | 64.6 | 34.6 | 0.7 |
| | 3 | 835 | 165 | Sodium hydrogen carbonate | — | 1130 | 96.1 | 64.6 | 34.6 | 0.7 |
| | 4 | 835 | 165 | Sodium hydrogen carbonate | 5 | 1040 | 95.9 | 64.9 | 34.9 | 0.1 |
| | 5 | 835 | 165 | Sodium hydrogen carbonate | 20 | 990 | 95.5 | 64.6 | 34.6 | 0.7 |
| | 6 | 983 | 17 | Sodium hydrogen carbonate | 5 | 1160 | 99.4 | 64.6 | 34.6 | 0.7 |

| | | Content (mass %) | | | D50 (μm) | Peak intensity ratio | Specific surface area (m$^2$/g) | Polishing rate (μm/min) | Scratch (number of count) | Deposition |
|---|---|---|---|---|---|---|---|---|---|---|
| | | [Pr$_6$O$_{11}$]/ TREO | F | Na/ TREO | | | | | | |
| Example | 1 | 0.1 | 2.4 | 0.15 | 1.3 | 0.16 | 3.4 | 0.43 | 10 | Good |
| | 2 | 0.1 | 3.9 | 0.15 | 1.3 | 0.27 | 3.4 | 0.45 | 11 | Excellent |
| | 3 | 0.1 | 3.9 | 0.06 | 1.3 | 0.20 | 3.4 | 0.45 | 17 | Good |
| | 4 | 0.1 | 3.9 | 0.30 | 1.3 | 0.32 | 3.4 | 0.45 | 15 | Excellent |
| | 5 | 0.1 | 3.9 | 0.15 | 1.3 | 0.26 | 3.4 | 0.45 | 19 | Excellent |
| | 6 | 0.1 | 3.9 | 0.15 | 1.3 | 0.28 | 3.4 | 0.45 | 17 | Excellent |
| | 7 | 0.1 | 3.9 | 0.15 | 1.3 | 0.22 | 3.4 | 0.45 | 18 | Excellent |
| | 8 | 0.1 | 2.9 | 0.15 | 1.3 | 0.17 | 3.4 | 0.45 | 22 | Excellent |
| | 9 | 0.1 | 2.4 | 0.15 | 1.3 | 0.14 | 3.4 | 0.45 | 24 | Excellent |
| | 10 | 0.1 | 0.9 | 0.01 | 1.3 | 0.07 | 3.4 | 0.45 | 19 | Excellent |
| | 11 | 0.1 | 0.9 | 0.15 | 1.3 | 0.11 | 3.4 | 0.45 | 20 | Excellent |
| | 12 | 0.1 | 3.9 | 0.15 | 0.9 | 0.26 | 8.0 | 0.44 | 13 | Excellent |
| | 13 | 0.1 | 3.9 | 0.15 | 1.6 | 0.28 | 3.0 | 0.44 | 25 | Excellent |
| | 14 | 0.1 | 3.9 | 0.15 | 1.6 | 0.27 | 2.7 | 0.46 | 31 | Excellent |
| | 15 | 0.1 | 3.9 | 0.15 | 1.3 | 0.28 | 3.4 | 0.45 | 12 | Excellent |
| | 16 | 0.1 | 3.9 | 0.15 | 1.3 | 0.27 | 3.4 | 0.45 | 14 | Excellent |
| Comparative Example | 1 | 0.1 | 4.7 | 0.15 | 1.3 | 0.35 | 3.4 | 0.45 | 87 | Excellent |
| | 2 | 0.1 | 5.6 | 0.15 | 1.3 | 0.40 | 3.4 | 0.45 | 98 | Excellent |
| | 3 | 0.1 | 3.9 | 0 | 1.3 | 0.16 | 3.4 | 0.39 | 53 | Poor |
| | 4 | 0.1 | 3.9 | 0.15 | 1.3 | 0.30 | 3.4 | 0.45 | 59 | Excellent |
| | 5 | 0.1 | 3.9 | 0.60 | 1.3 | 0.36 | 3.4 | 0.45 | 90 | Excellent |
| | 6 | 0.1 | 0.4 | 0.15 | 1.3 | 0 | 3.4 | 0.30 | 43 | Poor |

As shown in Table 2, it was proved that a high-quality polished surface can be obtained in Examples 1 to 16 at a high polishing rate, with the occurrence of scratches and the deposition of abrasive particles on the polished surface being suppressed.

In contrast, with a high fluorine atom content (Comparative Examples 1 and 2), with a low content of neodymium (Comparative Example 4), or with a high sodium atom content (Comparative Example 5), many scratches occurred, though a high polishing rate was achieved.

Furthermore, with no content of sodium atoms (Comparative Example 3), or with a low fluorine atom content (Comparative Example 6), the polishing rate was low, deposition of the abrasive particles on the polished surface was observed, and the quality of the polished surface was poor. In that case, a firing temperature of higher than 1100° C. was required to obtain the abrasive having a specific surface area equivalent to that of Example 2.

The invention claimed is:

1. A cerium-based abrasive comprising a cubic composite rare earth oxide and a composite rare earth oxyfluoride,
    containing 95.0 to 99.5 mass % of total rare earth elements in terms of oxides,
    containing 54.5 to 95.0 mass % of cerium in terms of oxide, 4.5 to 45.0 mass % of lanthanum in terms of oxide, and 0.5 to 1.0 mass % of neodymium in terms of oxide relative to the total rare earth elements in terms of oxides,
    containing 0.5 to 4.0 mass % of fluorine atoms, and
    containing 0.005 to 0.30 mass % of sodium atoms relative to the total rare earth elements in terms of oxides.

2. The cerium-based abrasive according to claim 1, wherein the intensity ratio of the main peak of the rare earth oxyfluoride to the main peak of the cubic composite rare earth oxide in the X-ray diffraction measurement using Cu Kα radiation is 0.01 to 0.50.

3. A method for manufacturing the cerium-based abrasive according to claim 1, comprising the steps of:
    firing mixed light rare earth compounds containing cerium, lanthanum and neodymium at 500 to 1100° C. to obtain mixed rare earth oxides,
    adding rare earth fluorides containing cerium, lanthanum and neodymium to the mixed rare earth oxides, and
    pulverizing and firing a resultant mixture,
    wherein a sodium compound is added prior to the firing.

4. The method according to claim 3, wherein the rare earth fluorides are obtained by adding fluorides to the mixed light rare earth compounds and heat-treating the mixture at 400° C. or lower.

5. The method according to claim 3, wherein the mixing mass ratio of the mixed rare earth oxides to the rare earth fluorides to be added is 99:1 to 65:35.

6. The method according to claim 3, wherein the sodium compound is at least one sodium salt selected from the group consisting of sodium hydrogen carbonate, sodium carbonate, sodium acetate, sodium phosphate, sodium sulfate, sodium nitrate, sodium oxalate and sodium polyacrylate.

* * * * *